United States Patent
Pu et al.

(10) Patent No.: US 11,118,102 B2
(45) Date of Patent: Sep. 14, 2021

(54) MINE APPLICATION METHOD FOR IN-SITU NANO-MICROSPHERES TO INCREASE CRUDE OIL RECOVERY RATE

(71) Applicant: Southwest Petroleum University, Chengdu (CN)

(72) Inventors: Wanfen Pu, Chengdu (CN); Rui Liu, Chengdu (CN); Fayang Jin, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/764,580

(22) PCT Filed: Jul. 3, 2019

(86) PCT No.: PCT/CN2019/094594
§ 371 (c)(1),
(2) Date: May 15, 2020

(87) PCT Pub. No.: WO2020/248309
PCT Pub. Date: Dec. 17, 2020

(65) Prior Publication Data
US 2021/0189221 A1    Jun. 24, 2021

(30) Foreign Application Priority Data
Jun. 14, 2019 (CN) .......................... 201910515010.1

(51) Int. Cl.
*E21B 43/20* (2006.01)
*C09K 8/588* (2006.01)

(52) U.S. Cl.
CPC .............. *C09K 8/588* (2013.01); *E21B 43/20* (2013.01); *C09K 2208/10* (2013.01)

(58) Field of Classification Search
CPC ................................ C09K 8/588; E21B 43/20
See application file for complete search history.

(56) References Cited

U.S. PATENT DOCUMENTS 4,756,370 A      7/1988 DeBons
10,457,856 B2 * 10/2019 Kalgaonkar ............ E21B 43/26
(Continued)

FOREIGN PATENT DOCUMENTS

CN    1152587 A    6/1997
CN    101314711 A  12/2008
(Continued)

OTHER PUBLICATIONS

Shujuan, Li et al. "Mechanism and Application Status of Deep Fluid Flow Diversion and Profile Control and Flooding in Oil Reservoirs in China" IN: China Petroleum & Petrochemicals, 2017, vol. 06), pp. 8-9.
(Continued)

*Primary Examiner* — Silvana C Runyan
(74) *Attorney, Agent, or Firm* — Pearne & Gordon LLP (57) ABSTRACT

A mine application method for in-situ nano-microspheres is provided. A water-soluble macromolecule A base fluid, a certain amount of isolation fluid (an isolation fluid slug can be designed according to actual conditions of the mine), and a water-soluble macromolecule B base fluid are pumped into the formulation in sequence; when macromolecules A and B are mixed or contacted with each other, they are assembled under the drive of an extremely strong hydrogen bonding effect and quickly constructed in-situ to form a nano-microscale spherical dispersion. The nano-microspheres have a certain fluidity control ability and excellent fluid flow diversion performance, which significantly improves a fluid absorption profile of the heterogeneous formation, exhibits deep intelligent profile control and flooding, and greatly increases the crude oil recovery rate.

10 Claims, 2 Drawing Sheets

(56) References Cited

U.S. PATENT DOCUMENTS

| | | | |
|---|---|---|---|
| 2013/0130950 A1 | 5/2013 | Chen et al. | |
| 2017/0015895 A1* | 1/2017 | Cox | C09K 8/42 |
| 2018/0298274 A1* | 10/2018 | Zhao | C09K 8/588 |

FOREIGN PATENT DOCUMENTS

| | | |
|---|---|---|
| CN | 102140337 A | 8/2011 |
| CN | 104650842 A | 5/2015 |
| CN | 108661612 A | 10/2018 |
| CN | 109403932 A | 3/2019 |

OTHER PUBLICATIONS

Choi, Sang Koo et al. "Nanofluid enhanced oil recovery using hydrophobically associative zwitterionic polymer-coated silica nanoparticles" IN: Energy & Fuels, 2017, vol. 31, No. 8, pp. 7777-7782.

Imqam, Abdulmohsin et al. "Preformed-Particle-Gel Transport Through Heterogeneous Void-Space Conduits" IN: Society of Petroleum Engineers Journal, 2017, pp. 1-11.

English Translation of the Written Opinion for PCT/CN2019/094594 dated Mar. 19, 2020.

Bo, Zhang et al. "Evaluation of Profile Control Performances of Phenolic Resin Jelly in Offshore Oilfield" IN: Petroleum Geology and Recovery Efficiency, 2010, vol. 17, No. 5, pp. 42-45.

English Translation of the International Search Report for PCT/CN2019/094594 dated Mar. 19, 2020.

International Search Report for PCT/CN2019/094594 dated Mar. 19, 2020.

\* cited by examiner

MINE APPLICATION METHOD FOR IN-SITU NANO-MICROSPHERES TO INCREASE CRUDE OIL RECOVERY RATE

CROSS-REFERENCE TO RELATED APPLICATIONS

This is a National Stage application of PCT international application PCT/CN2019/094594, filed on Jul. 3, 2019, which claims the priority of Chinese Patent Application No. 2019105150101, filed Jun. 14, 2019, both of which are incorporated herein by reference in their entirety.

TECHNICAL FIELD

The present invention relates to an application of in-situ nano-microspheres in oil reservoirs, and more particularly to a mine application method for in-situ nano-microspheres to increase a crude oil recovery rate, belonging to the technical field of colloid and interface chemistry, oil field chemistry and oil field mining.

BACKGROUND ART

Affected by the heterogeneity of a formation, an oil reservoir which is developed by water flooding has a low water-flooding sweep coefficient, severe water channeling in a high permeability zone, high water content in produced fluid, and a low water-flooding extraction rate. The deep profile control and flooding technology is an important technology for driving a high water cut heterogeneous oil reservoir to stabilize oil and control water. Commonly used profile control and flooding systems at home and abroad include foam, weak gel, jelly dispersion, colloidal dispersion glue, pre-crosslinked particles and microspheres (Li Shujuan, Zhang Beiming, Li Donglin. Mechanism and Application Status of Deep Fluid Flow Diversion and Profile Control and Flooding in Oil Reservoirs in China [J]. China Petroleum & Petrochemicals, 2017(06):8-9). A surfactant aqueous solution and gas are injected into a formation at a certain ratio. Under the continuous shear action of a porous medium, the gas and the surfactant aqueous solution generate foams. The foams have better fluidity control ability, increase an injection pressure, and improve a fluid absorption profile. A gas-fluid ratio is an important factor that affects the overall performances of the foams. A gas injection rate and a fluid injection rate must be strictly controlled to obtain a foam system with better performances. In addition, gas injection equipment that requires large displacement and high pressure is used in a mine, which occupies a large space and has relatively high cost. Weak gel is a weakly cross-linked polymer with a formation viscosity of several thousand to tens of thousands of mPa·s formed by cross-linking of low-concentration polymers with phenolic, organic chromium and other cross-linking agents (Zhang Bo, Dai Caili, Zhao Juan, et al. Evaluation of Profile Control Performances of Phenolic Resin Jelly in Offshore Oilfield [J]. Petroleum Geology and Recovery Efficiency, 2010, 5:42-45). Under the action of cross-linking agents, jelly dispersion and colloidal dispersion glue form a dispersion glue system of macro scale (jelly dispersion) and micro-meso scale (colloid dispersion glue), wherein the cross-linking agents are generally chromium acetate, aluminum citrate and the like. The common feature of the weak gel, the jelly dispersion and the colloidal dispersion glue is that the polymer system and the cross-linking agents form a gel in the formation after a few hours to several days, wherein the cross-linking agents (especially a high-valent metal ion cross-linking agent) have great pollution on the environment, and the post-processing cost of the produced fluid is high. Pre-crosslinked particles are dispersed particles which are formed by granulating, drying and crushing bulk gel formed by polymerizing and cross-linking on the ground, have the characteristics of high stability, high temperature resistance, high salt resistance and the like, but must be crushed on the ground to a scale that meets the injectability (Imqam, A., Wang, Z., Bai, B. Preformed-Particle-Gel Transport Through Heterogeneous Void-Space Conduits. SPE Journal, 2017, 1437-1447). In addition, the pre-crosslinked particles are easy to absorb water and settle in injection water, thereby affecting the injection properties and deep propagation of the pre-crosslinked particles.

Polymer microspheres are of a polymer circular dispersion with a particle size in the range of tens of nanometers to hundreds of micrometers, and have high modificability, excellent permeability and fluidity. Therefore, the deep profile control and flooding technology of polymer microspheres has received extensive attention from scholars at home and abroad. When polymer microspheres are nano-microsphere dispersions prepared indoors, inverse emulsion polymerization is the most classic preparation method. In addition to polymerized monomers, a large amount of emulsifier, oil phase and initiator are required, and the preparation conditions are more demanding. In addition, amphiphilic macromolecule hybrid nanomaterials can also be used to prepare functional nano-microspheres (Choi S K, Son H A, Kim H T, et al. Nanofluid enhanced oil recovery using hydrophobically associative zwitterionic polymer-coated silica nanoparticles [J]. Energy & Fuels, 2017, 31 (8):7777-7782). This requires a multi-step method or controllable activity preparation, resulting in strict synthesis conditions and high cost. Furthermore, the polymer microspheres have a large specific surface area. During pumping, the fluid absorbed in the near-well zone tends to aggregate and settle, and the effective concentration of the polymer microspheres also affects their deep regulation performances.

SUMMARY OF THE INVENTION

An object of the present invention is to provide a mine application method for in-situ nano-microspheres to increase a crude oil recovery rate. The in-situ nano-microspheres are of a spherical dispersion with a controllable size formed in a formation quickly in situ. The method of the present invention is reliable in principle, cheap and easily available in raw materials and outstanding in economic benefits, can improve the fluid absorption capability of a low-permeability area, effectively regulate a high-permeability area and drive efficient development of a water-flooding oil reservoir, and has an industrial application prospect.

To fulfill the above technical object, the present invention adopts the following technical solutions.

According to the mine application method for the in-situ nano-microspheres, a water-soluble macromolecule A base fluid, a certain amount of isolation fluid (an isolation fluid slug can be designed according to actual conditions of the mine), and a water-soluble macromolecule B base fluid are pumped into the formulation in sequence; when macromolecules A and B are mixed (contacted) with each other, they are assembled under the drive of an extremely strong hydrogen bonding effect and quickly constructed in situ to form a nano-microscale spherical dispersion. The nano-microspheres have a certain fluidity control ability and excellent fluid flow diversion performance, which significantly improves a fluid absorption profile of the heterogeneous formation, realizes deep intelligent profile control and flooding, and greatly increases the crude oil recovery rate.

A mine application method for the in-situ nano-microspheres to increase a crude oil recovery rate sequentially comprises the following steps:

(1) preparing a macromolecule A solution and a macromolecule B solution having a mass concentration of 0.1~5.0% from site injection water respectively (the concentrations of macromolecule A and B solutions prepared on site need to consider the diffusion and dispersion effects of the macromolecules A and B in the formation); adding a fluidity regulator having a mass concentration of 0.05~0.1% and an oxygen scavenger having a mass concentration of 0.002~0.05% into the macromolecule A solution; adding an oxygen scavenger having a mass concentration of 0.002~0.05% into the macromolecule B solution; and stirring for 15~30 minutes to ensure they are sufficiently mixed;

(2) injecting the macromolecule A solution with 0.1~0.5 times of pore volume into the formation;

(3) injecting an isolation fluid slug with 0.02~0.05 times of pore volume;

(4) injecting the macromolecule B solution with 0.1~0.5 times of pore volume; and (5) constructing the macromolecules A and B rapidly in situ to form the nano-microspheres under the drive of hydrogen bonds because the macromolecules A and B generates an extremely strong supramolecular hydrogen bonding effect during the contact process in the formation, thereby promoting the fluid flow diversion and increasing the recovery rate of a high water-cut oilfield.

In the step (2), the isolation fluid is injection water.

In the step (4), after the macromolecule B solution is injected, a certain amount of injection water slug is injected for replacement.

A processing distance of the in-situ nano-microspheres in the formation may be adjusted by the size of the isolation fluid slug, thereby achieving deep profile control and flooding of the in-situ nano-microspheres in an oil reservoir.

According to the mine application method for the nano-microspheres to increase the crude oil recovery rate, wherein the properties of the formation reservoir are as follows: the temperature is up to 120° C., and the mineralization degree of water is up to $20\times10^4$ mg/L.

The scale (particle size) of the nano-microspheres is mainly controlled by the type and molecular weight of the macromolecules A and the type of the macromolecules B, and the scale control of the in-situ nano-microspheres can be achieved by selecting the type and molecular weight of the corresponding macromolecule A, and the corresponding macromolecule B according to the heterogeneity and permeability of the oil reservoir.

The macromolecules A are of a straight-chain water-soluble polymer with an ethyl ether or propyl ether structure.

The macromolecules A are polypropylene glycol, fatty alcohol polyoxyethylene ether, methallyl alcohol polyoxyethylene ether or allyl alcohol polyoxyethylene ether.

The polypropylene glycol has a molecular structural formula as follows:

in which, x is the degree of polymerization.

The fatty alcohol polyoxyethylene ether, methallyl alcohol polyoxyethylene ether and allyl alcohol polyoxyethylene ether have a molecular structural formula as follows:

in which, R is an alkyl chain—$(CH_2)_nCH_3$ (fatty alcohol polyoxyethylene ether), $CH=CHCH_3$ (methallyl alcohol polyoxyethylene ether) or $CH=CH_2$ (allyl alcohol polyoxyethylene ether); n is the degree of polymerization.

The macromolecules B are of a water-soluble polymer with a polyhydroxyl or polyphenolic structure.

The macromolecules B are carboxymethyl-β-cyclodextrin, tannin extract or tea polyphenol.

The carboxymethyl-β-cyclodextrin has a molecular structural formula as follows:

The tannin extract has a molecular structural formula as follows:

The tea polyphenol has a molecular structural formula as follows:

The fluidity regulator is one of amylose, chitosan hydrochloride, xanthan gum, and carboxymethyl cellulose.

The oxygen scavenger is thiourea.

The monodispersed nano-microspheres involve 4 types of macromolecules A, and 3 types of macromolecules B, wherein the macromolecules A and macromolecules B are intermolecularly assembled, so there are 12 types of molecular structures of the monodispersed nano-microspheres. The present invention aims to provide exemplary structures.

(1) A monodispersed nano-microsphere constructed with polypropylene glycol and tea polyphenol has a structure as follows:

in which, R1 is —$(CH_2CH_2CH_2O)_aH$.

(2) A monodispersed nano-microsphere constructed with allyl alcohol polyoxyethylene ether and carboxymethyl-β-cyclodextrin has a structure as follows:

in which, R2 is —(CH$_2$CH$_2$O)$_b$(CH$_2$)$_d$CH=CH$_2$.

(3) A monodispersed nano-microsphere constructed with fatty alcohol polyoxyethylene ether and tannin extract has a structure as follows:

In which, R3 is —(CH$_2$CH$_2$O)$_b$(CH$_2$)$_d$CH$_3$.

The above substances are all commercially available.

According to the mine application method for the in-situ nano-microspheres to increase the crude oil recovery rate, in the step (1), in percentage by weight: the macromolecules A are preferably 0.5%, the macromolecules B are preferably 0.5%, the fluidity regulator is preferably 0.05%, and the oxygen scavenger is preferably 0.01%.

The in-situ construction mechanism of the nano-microspheres is as follows: (1) the macromolecules A and B are coordinated macromolecules that are hydrogen-bonded to each other and have a very strong hydrogen bonding effect; (2) a certain amount of fluidity regulator is added to the macromolecule A solution to make the macromolecule A solution have a smaller fluidity than that of the macromolecule B solution, ensuring that the macromolecules A and B are fully and effectively mixed (contacted) in the formation; (3) during the mutual contact process of the macromolecules A and B in an aqueous solution, A and B have a very strong supramolecular hydrogen bonding effect, and are assembled under the drive of hydrogen bonds to form the nano-microspheres quickly.

An intelligent profile control and flooding mechanism of the in-situ nano-microspheres is as follows: (1) a certain amount of fluidity regulator is added to the macromolecule A solution to make the macromolecule A solution have a smaller fluidity than that of the macromolecule B solution, ensuring that the macromolecules A and B are fully and effectively mixed (contacted) in the formation; (2) affected by the heterogeneity of the formation, the macromolecule A and B solutions preferentially enter a high permeability area, so the nano-microspheres are mainly formed in situ in a high permeability band, and no erroneous plugging occurs in the formation; (3) a processing distance of in-situ nano-microspheres in the formation can be adjusted according to the size of the isolation fluid slug; (4) the adsorption of the nano-microspheres in a high permeability zone and their intelligent plugging and regulation of pore throats during the migration process increase the seepage resistance in high permeability areas, thereby promoting subsequent fluid injection into low permeability areas, adjusting a fluid absorption profile of the formation, and expanding the sweep coefficient of fluid to achieve balanced displacement in high and low permeability areas.

Compared with the prior art, the present invention has the following beneficial effects:

(1) the macromolecules A are cheap and rich in raw materials; the macromolecules B are natural organic macromolecules with rich sources, low price, and environmental protection;

(2) the macromolecules A and B are directly dissolved in mineralized water, and the dissolution time is less than 30 minutes; the macromolecules A and B have good injectability and can stay deeply the oil reservoir;

(3) the macromolecules A and B have a solid content greater than 90%, are very convenient to transport, can be injected without being limited by the size of a mine platform, and are simple in construction process;

(4) the macromolecules A and B are driven by hydrogen bond coupling to construct the in-situ nano-microspheres in the formation without any initiator, emulsifier and cross-linking agent, no by-products are generated, such that the in-situ nano-microspheres are high in generation efficiency and environment-friendly, have very obvious advantages of energy saving and emission reduction;

(5) the monodispersed nano-microspheres have strong controllability in particle size; and (6) the nano-microspheres are suitable for an oil reservoir with a temperature up to 120° C. and a water mineralization degree up to $20 \times 10^4$ mg/L, covering a wide range of oil reservoirs.

DETAILED DESCRIPTION

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

A mine application method for in-situ nano-microspheres comprises the following steps: preparing a macromolecule A solution having a mass concentration of 0.5% and a macromolecule B solution having a mass concentration of 0.5% from site injection water, respectively; adding a fluidity regulator having a mass concentration of 0.05% and an oxygen scavenger having a mass concentration of 0.01% into the macromolecule A solution; adding an oxygen scavenger having a mass concentration of 0.01% into the macromolecule B solution, and stirring for 15~30 minutes to ensure they are sufficiently mixed; injecting the macromolecule A solution with 0.1~0.5 times of pore volume (PV) into a formation; then injecting an isolation fluid (injection water) with 0.02~0.05 times of pore volume (PV); and finally injecting the macromolecule B solution with 0.1~0.5 times of pore volume (PV). In the contact process of the macromolecules A and B in the formation, the macromolecules A and B have an extremely strong supramolecular hydrogen bonding effect to construct the nano-microspheres quickly in situ.

Embodiment 1 Particle Size Distribution of In-Situ Nano-Microspheres

Figure 1:
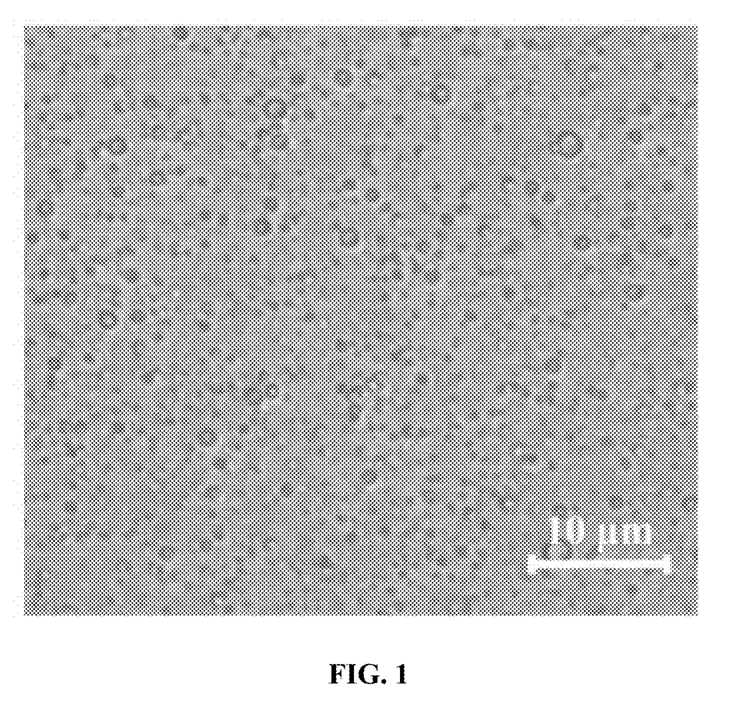
FIG. 1 is a micrograph of in-situ nano-microspheres.

Mineralized water 1# with a mineralization degree of $0.1 \times 10^4$ mg/L, mineralized water 2# with a mineralization degree of $5 \times 10^4$ mg/L, mineralized water 3# with a mineralization degree of $10 \times 10^4$ mg/L, and mineralized water 4# with a mineralization degree of $20 \times 10^4$ mg/L (the concentration of $Ca^{2+}$ and $Mg^{2+}$ in 1# to 4# is 5% of the total mineralization degree) are prepared respectively and stirred for 5 minutes; thiourea with a mass concentration of 0.01% is added and stirred for 5 minutes. Two parts of mineralized water in the same volume are taken and numbered 1#-1 and 1#-2, 2#-1 and 2#-2, 3#-1 and 3#-2, 4#-1 and 4#-2; 0.05% of carboxymethyl cellulose and 0.5% of fatty alcohol polyoxyethylene ether are added to 1#-1; 0.5% of carboxymethyl-β-cyclodextrin is added to 1#-2; 0.05% of chitosan hydrochloride and 0.5% of polypropylene glycol are added to 2#-1; 0.5% of tea polyphenol is added to 2#-2; 0.05% of amylose and 0.5% of methallyl alcohol polyoxyethylene ether are added to 3#-1; 0.5% of tannin extract is added to 3#-2; 0.05% of xanthan gum and 0.5% of fatty alcohol polyoxyethylene ether are added to 4#-1; 0.5% of tannin extract is added to 4#-2; the mixtures are stirred for 20 minutes, respectively; 1#-1, 2#-1, 3#-1 and 4#-1 solutions are added to 1#-2, 2#-2, 3#2 and 4#-2 macromolecular solutions in an isovolumetric ratio to form nano-microspheres numbered 1*, 2*, 3* and 4* in situ. The particle sizes of the nano-microspheres are uniformly dispersed, with a median particle size of 200 nm~50 m. The optical microscopic morphology of the 3* nano-microspheres constructed by 3#-1 and 3#-2 is shown in FIG. 1, with a median particle size of about 500 nm.

Embodiment 2 Long-Term Stability of In-Situ Nano-Microspheres

Figure 2:
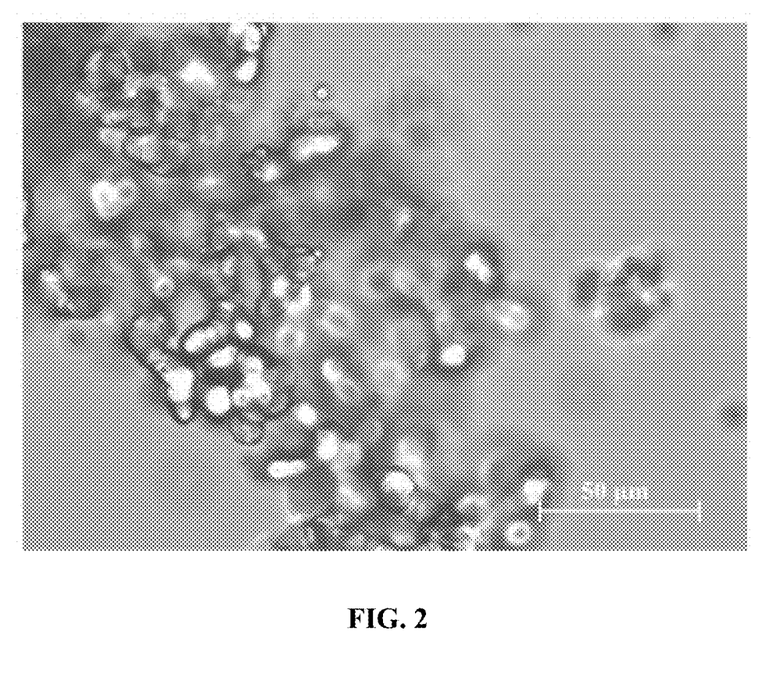
FIG. 2 is a micrograph of the in-situ nano-microspheres after aging.

The in-situ nano-microspheres 1 *, 2 *, 3 *, 4 * prepared according to Embodiment 1 are placed at 40° C., 80° C., 60° C. and 120° C., respectively, and aged for 90 days; the structure and morphology of the in-situ nano-microspheres after aging are observed with an optical microscope, wherein the in-situ nano-microspheres still maintain a stable spherical structure, and show long-term stability in an oil reservoir temperature and mineralization degree environment. The microscopic morphology of the 3* in-situ nano-microspheres aged at 80° C. for 90 days is shown in FIG. 2. The in-situ nano-microspheres expand during the aging process, and the spherical structure is regular, which reflects temperature and salt resistance. The expanded in-situ nano-microspheres have a median particle size of about 10 m, with an aggregation behavior.

Embodiment 3 Fluid Diversion Performance of In-Situ Nano-Microspheres

According to the in-situ nano-microspheres 1*, 2*, 3* and 4* prepared in Embodiment 1, the in-situ nano-microspheres are passed through 5 layers of 100-mesh screens using a displacement device at an injection rate of 0.2 mL/min. Because the in-situ nano-microspheres are stacked on the screens after overlapping, when an injection pressure reaches a certain value, due to good elasticity of the in-situ nano-microspheres, the in-situ nano-microspheres start to pass through multiple layers of screens, and the corresponding pressure at this time is called a diversion pressure (as shown in Table 1). The diversion pressure of the in-situ nano-microspheres is closely related to the particle size, which indicates that in mine application, the in-situ nano-microspheres with different particle sizes can be selected according to the permeability and heterogeneity of high permeability areas of the oil reservoir. In addition, after the in-situ nano-microspheres are passed through 5 layers of 100-mesh screens repeatedly for three times, the diversion pressures are basically the same, which indicates that the in-situ nano-microspheres have super shear resistance, and can effectively control the high-permeability area, promote the fluid flow to divert, increase the subsequent fluid sweep coefficient, and improve the development effect.

TABLE 1

Diversion pressure of in-situ nano-microspheres (experimental temperature 80° C.)

| No. | Diversion pressure kPa after passing the screens for the first time | Diversion pressure kPa after passing the screens for the second time | Diversion pressure kPa after passing the screens for the third time |
|---|---|---|---|
| 1* | 131.8 | 124.3 | 117.6 |
| 2* | 126.7 | 123.5 | 110.8 |
| 3* | 117.9 | 115.2 | 110.2 |
| 4* | 181.1 | 171.9 | 166.2 |

Embodiment 4 Formation of In-Situ Nano-Microspheres in Porous Medium and their Enhanced Potential of Crude Oil Recovery Rate 4#-1 and 4#-2 macromolecule solutions are prepared respectively according to the scheme in Embodiment 1 for later use. an artificial short one-dimensional core (having a size of Ø38×75 and a water permeability of 740 mD, an average porosity of 23.5%, and an original oil saturation of 67.3%; the mineralization degree of injection water is $20 \times 10^4$ mg/L, wherein the concentration of $Ca^{2+}$ and $Mg^{2+}$ is 5% of the total mineralization degree), wherein the experimental temperature is 90° C., the viscosity of crude oil is 47.3 mPa·s, and the fixed displacement rate is 0.2 mL/min. In the water-flooding stage, affected by the unfavorable water-oil fluidity ratio, the waterflooding recovery is low, and the recovery rate of crude oil having a water content of 98% is 40.2%.

Figure 3:
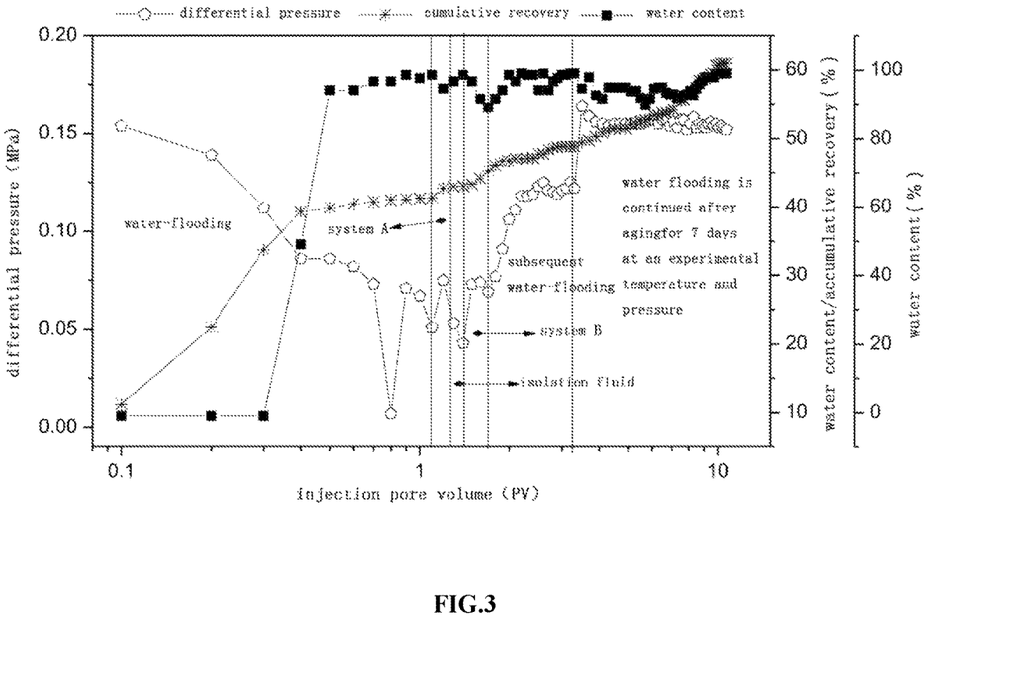
FIG. 3 is an effect diagram showing the formation of in-situ nano-microspheres in a porous medium and their enhanced crude oil recovery rate.

Firstly, 0.2 PV of 4#-1 macromolecular solution is injected, followed by 0.03 PV of injection water (isolation fluid). The injection pressure does not change significantly, and the water content is almost unchanged, which demonstrates the 4#-1 macromolecular solution mainly enters a high permeability area. 0.2 PV of 4#-2 macromolecular solution is then injected. At the initial stage of injection, the pressure remains stable. With the increase of the injection amount, the pressure gradually increases and the oil is produced again, which indicates that the macromolecules A in 4#-1 and the macromolecules B in 4#-2 form nano-microspheres at the moment of mixing in a porous medium, thereby intelligently plugging and regulating the high permeability area during the migration, increasing the seepage resistance, promoting the subsequent fluid injection into a low permeability area, and increasing the sweep coefficient of fluid. When water flooding is performed subsequently to reach a water content of 98%, and the crude oil recovery rate of the in-situ nano-microspheres is increased by 8.2%. The temperature and the pressure state of the core are maintained, and water flooding is continued after 7 days of aging. The displacement pressure is significantly higher than the pressure of subsequent water flooding, which demonstrates that the in-situ nano-microspheres expand during the aging in the porous medium, and the profile control and flooding capabilities are further enhanced. Oil is produced from the core again. When the water flooding is performed subsequently to reach a water content of 98%, the crude oil recovery rate of the in-situ nano-microspheres after aging and expanding is further increased by 12.5%. After the water flooding is performed to reach a water content of 98%, the enhanced crude oil recovery rate by the in-situ nano-microspheres is 20.7%. The cumulative recovery rate is 60.9%. The formation of the in-situ nano-microspheres in a porous medium and the effect of increasing the crude oil recovery rate are shown in FIG. 3.

The invention claimed is:

1. A mine application method for in-situ nano-microspheres to increase a crude oil recovery rate, sequentially comprising:
    (1) preparing a macromolecule A solution having a mass concentration of 0.1~5.0% and a macromolecule B solution having a mass concentration of 0.1~5.0% from site injection water respectively; adding a fluidity regulator having a mass concentration of 0.05~0.1% and an oxygen scavenger having a mass concentration of 0.002~0.05% into the macromolecule A solution; adding an oxygen scavenger having a mass concentration of 0.002~0.05% into the macromolecule B solution; and stirring for 15~30 minutes to ensure they are sufficiently mixed;
    (2) injecting the macromolecule A solution with 0.1~0.5 times of pore volume into a formation;
    (3) injecting an isolation fluid slug with 0.02~0.05 times of pore volume;
    (4) injecting the macromolecule B solution with 0.1~0.5 times of pore volume; and
    (5) constructing the macromolecules A and B rapidly in situ to form the in-situ nano-microspheres under a drive of hydrogen bonds because the macromolecules A and B generates an extremely strong a supramolecular hydrogen bonding effect during a contact process in the formation, thereby promoting a fluid flow diversion and increasing a recovery rate of a high water cut an oilfield.

2. The mine application method for the in-situ nano-microspheres to increase crude oil recovery rate according to claim 1, wherein the macromolecules A are of a straight-chain water-soluble polymers with an ethyl ether or propyl ether structure, and the macromolecules B are of a water-soluble polymer with a polyhydroxyl or polyphenolic structure.

3. The mine application method for the in-situ nano-microspheres to increase crude oil recovery rate according to claim 2, wherein the macromolecules A are polypropylene glycol, fatty alcohol polyoxyethylene ether, methallyl alcohol polyoxyethylene ether or allyl alcohol polyoxyethylene ether, and the macromolecules B are carboxymethyl-62-cyclodextrin, tannin extract or tea polyphenol.

4. The mine application method for the in-situ nano-microspheres to increase crude oil recovery rate according to claim 1, wherein the fluidity regulator is one of amylose, chitosan hydrochloride, xanthan gum, and carboxymethyl cellulose.

5. The mine application method for the in-situ nano-microspheres to increase crude oil recovery rate according to claim 1, wherein the oxygen scavenger is thiourea.

6. The mine application method for the in-situ nano-microspheres to increase crude oil recovery rate according to claim 1, wherein in the step (2), the isolation fluid is injection water.

7. The mine application method for the in-situ nano-microspheres to increase crude oil recovery rate according to claim 1, wherein in the step (4), after the macromolecule B solution is injected, a certain amount of injection water slug is injected for replacement.

8. The mine application method for the in-situ nano-microspheres to increase crude oil recovery rate according to claim 1, wherein a processing distance of the in-situ nano-microspheres in the formation is adjusted by the size of the isolation fluid slug.

9. The mine application method for the in-situ nano-microspheres to increase crude oil recovery rate according to claim 1, wherein properties of the formation reservoir are as follows: temperature is up to 120° C. and mineralization degree of water is up to $20 \times 10^4$ mg/L.

10. The mine application method for the in-situ nano-microspheres to increase crude oil recovery rate according to claim 1, wherein a scale of the nano-microspheres is mainly controlled by type and molecular weight of the macromolecules A and type of the macromolecules B, and scale control of the in-situ nano-microspheres can be achieved by selecting the type and molecular weight of corresponding macromolecules A and macromolecules B according to heterogeneity and permeability.

* * * * *

UNITED STATES PATENT AND TRADEMARK OFFICE
CERTIFICATE OF CORRECTION

PATENT NO. : 11,118,102 B2
APPLICATION NO. : 16/764580
DATED : September 14, 2021
INVENTOR(S) : Wanfen Pu Page 1 of 1

It is certified that error appears in the above-identified patent and that said Letters Patent is hereby corrected as shown below:

In the Claims

In Column 12, Claim 1, Line 44, "rate of a high water cut an" should read --rate of an--.

In Column 12, Claim 3, Line 58, "B are carboxymethyl-62" should be --B are carboxymethyl-β--.

Signed and Sealed this
Twenty-sixth Day of April, 2022

Katherine Kelly Vidal
*Director of the United States Patent and Trademark Office*